Figure 1:
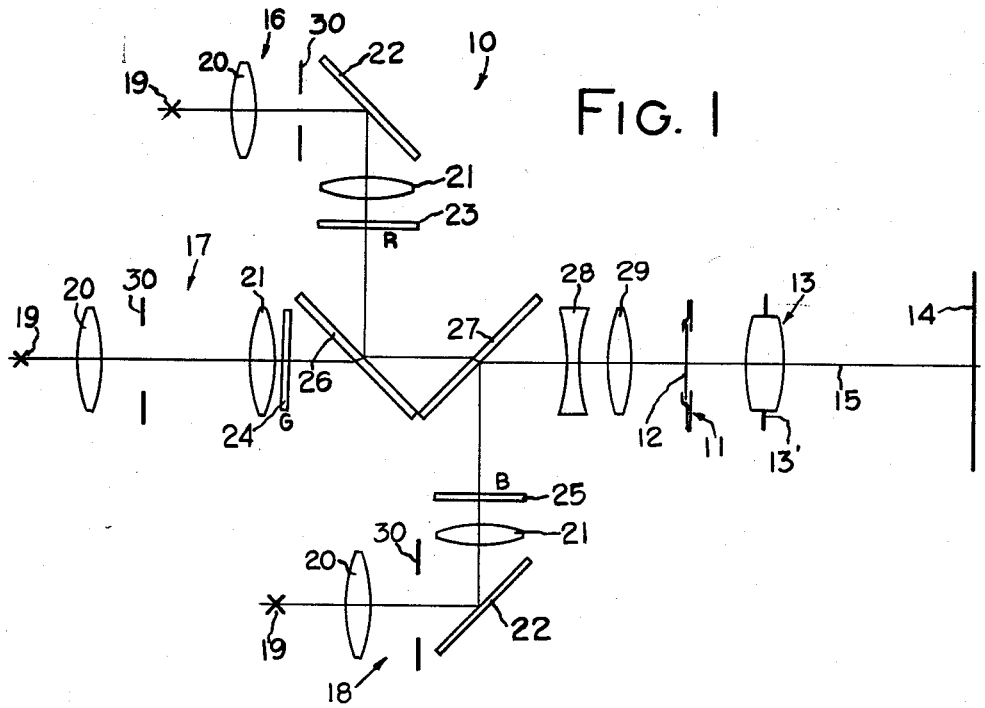

A. E. ALDEN
H. E. ROSENBERGER
INVENTORS

ATTORNEY

Oct. 20, 1959  A. E. ALDEN ET AL  2,909,097
PROJECTION APPARATUS
Filed Dec. 4, 1956  2 Sheets-Sheet 2
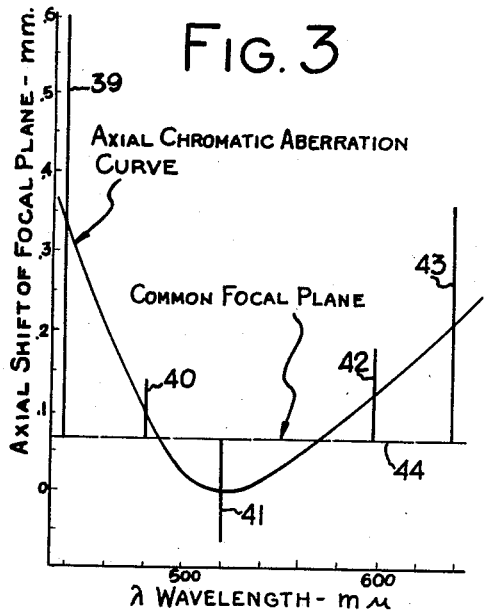
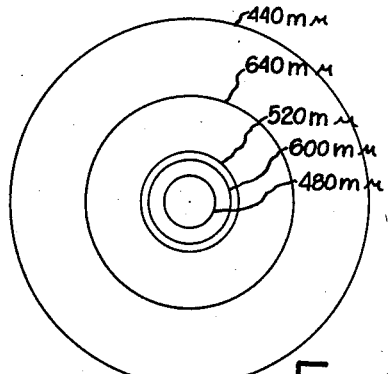
Fig. 6
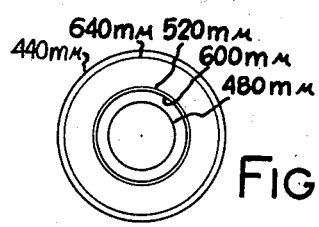
Fig. 7
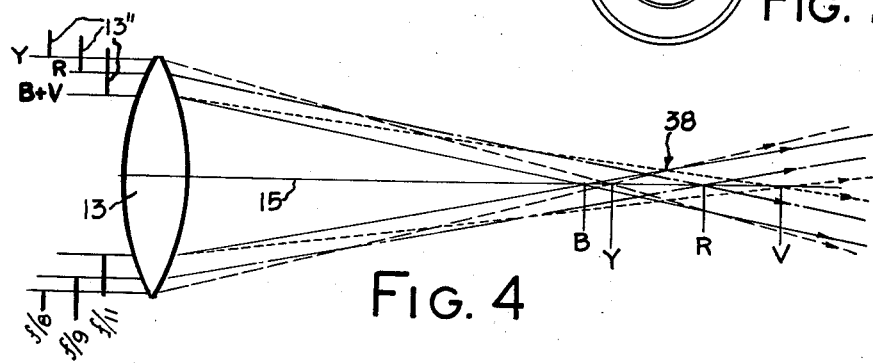
Fig. 4
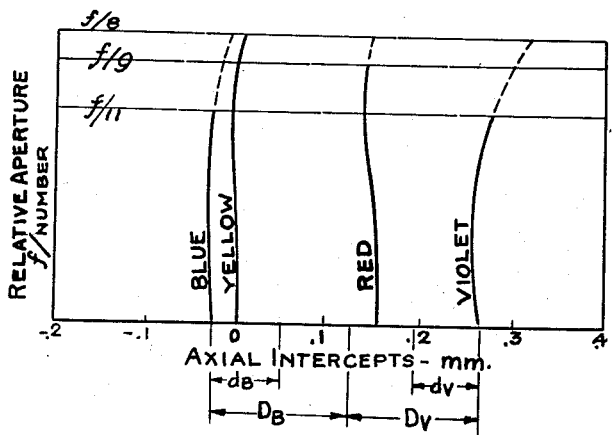
Fig. 5
A. E. ALDEN
H. E. ROSENBERGER
INVENTORS
BY *[signature]*
ATTORNEY

United States Patent Office 2,909,097
Patented Oct. 20, 1959

2,909,097

PROJECTION APPARATUS

Alex Eugene Alden, Stamford, Conn., and Harold E. Rosenberger, Brighton, N.Y.; said Alden assignor to Twentieth Century-Fox Film Corporation, New York, N.Y., and said Rosenberger assignor to Bausch & Lomb Optical Company, Rochester, N.Y., both corporations of New York Application December 4, 1956, Serial No. 626,249

3 Claims. (Cl. 88—24)

This invention relates to projection apparatus and the like having a lens for forming an image of a subject at an image plane and more particularly it relates to improved means and method for compensating for the residual chromatic aberrations of said lens.

Because of continuing efforts to improve the image forming properties of projection lenses, particularly with regard to those lenses which are used in the projection of colored photographic film, it has been discovered that the small amounts of residual chromatism found in well corrected lenses may produce observable defects in the projected image. It is well known to lens designers that perfect achromatism in such a projection lens cannot be achieved by refractive means alone because of the necessity of simultaneously reducing chromatic and spherical aberrations, astigmatism, coma, field curvature and other conditions to their least harmful state. Therefore, residual chromatic aberrations are always present in a projection lens in some degree. The need for correction of the residual chromatism of a lens exists not only in the projection of colored films but also in the projection of the conventional black and white film and such correction may furthermore be of considerable benefit in various types of optical systems, wherein the subject to be projected is substantially transparent, such as in microscopes and other optical apparatus.

One of the objects of this invention is to provide improved means for compensating the residual chromatic aberrations of a lens which is used for forming an image of an object.

Another object is to provide a film projection apparatus in which the residual chromatic aberrations of the projection lens are compensated by selectively diaphragming the colored components of the light which illuminates the film to thereby improve the projected image.

Still another object is to provide an improved method for compensating the residual chromatism of a projection lens.

A further object is to provide apparatus which is used for projecting an image of a colored film or the like and includes a lens having residual chromatic aberrations and means for selectively diaphragming the color components of the light which illuminates the film in order to compensate for the chromatic aberrations of the lens.

Figure 2:
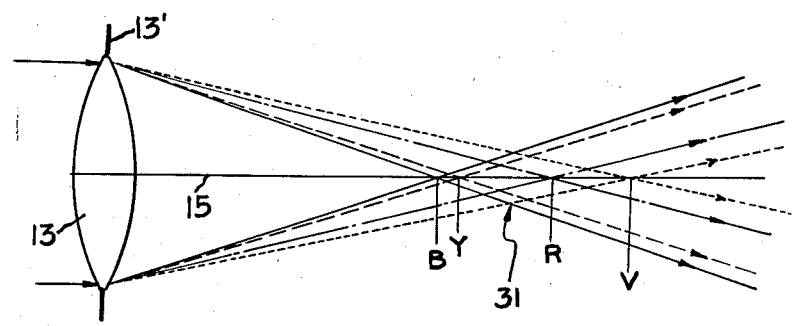

Further objects and advantages will be apparent from the details of construction and arrangement and combination of parts of the invention by reference to the specification herebelow and the accompanying drawings in which:

Fig. 1 is a diagrammatic view of a projector of the aforesaid kind showing a preferred form of our invention, Fig. 2 is a ray diagram illustrating the axial chromatism of a lens, Fig. 3 is a graph showing certain optical conditions in the projection system of our invention, Figs. 4 and 5 are a ray diagram and a graph, respectively, showing focal and diaphragming conditions for projected light of different colors in said projector, and Figs. 6 and 7 are comparative diagrams showing optical conditions that are found in two different conditions of diaphragming.

A projection lens has an optimum speed or $f$/number for each and every wavelength band of light. If the lens is opened above the optimum $f$/number, the projected image will be deteriorated by aberrations and if closed down below this optimum $f$/number, the image will suffer deterioration because of diffraction effects. The "$f$/number" may be defined as being the ratio of the focal length of a lens system to the diameter of its entrance pupil. In the practice of our invention, independent controls are provided for the speeds of the respective color components of light used to illuminate the object so that each color band can be set at its optimum $f$/number and thereby provide a greatly improved projected image.

A preferred form of our invention is shown in Fig. 1 of the drawing wherein a printing projector for colored film is represented generally by the numeral 10. Said projector 10 is provided with the usual film guiding mechanism 11 in which a film 12 to be printed or projected is slidably held and through which the film is moved in a conventional manner. Aligned on an optical axis 15 therewith is a projection lens 13 having the usual residual chromatic aberrations therein, which focuses the image upon a sensitized and unexposed color film 14 which lies in the image plane of the lens 13 on the principal axis 15. The projection lens 13 may be of any preferred type of well corrected lens having a small residual chromatic aberration which cannot be removed in the usual manner by the lens designer.

For transilluminating the film 12, preferably three component light colors such as red, blue and green are added together, by combining the light output of three subsidiary illuminating optical systems 16, 17 and 18. The subsidiary optical systems 16, 17 and 18 each comprise a suitable light source 19, a condensing lens 20 and a relay lens 21 in optical alignment with each other for the purpose of projecting an image of the respective light sources into the aperture of the aforesaid projection lens 13. In each of the subsidiary systems 16 and 18, a deflection mirror 22 is preferably located between the lenses 20 and 21 to direct the light beam laterally toward the axis of the third optical system 17.

Adjacent to each relay lens 21 there is provided a light filter, the red filter 23 being arranged in system 16, the green filter 24 being arranged in system 17 and the blue filter 25 being arranged in system 18. Red light passing through the filter 23 is reflected from an angularly placed dichroic beam divider 26 so as to combine with the green light passing through the filter 24, the dichroic member 26 being suitably constructed to pass green light and reflect red light. Blue light passing through the filter 25 is reflected from a dichroic beam divider 27 which is optically aligned in angular relation to the first dichroic beam divider 26, said beam divider 27 being constructed and arranged to pass the red and green light projected from the subsidiary systems 16 and 17. The mixed light so formed is projected upon the film 12 to transilluminate it by any preferred lens combination such as the negative lens 28 used together with an adjacent positive lens 29 located ahead of this film, which lenses act in combination with the subsidiary optical systems 16, 17 and 18 to form coincident images of the light sources 19 and diaphragms 30 simultaneously in the plane of the diaphragm 13' of the projection lens 13.

According to this invention, means are provided for compensating the aforesaid residual chromatic aberrations of the projection lens 13 so as to obtain improved image quality in the projected image and said means comprise an adjustable auxiliary diaphragm 30 located between the lenses 20 and 21 in each subsidiary optical system 16, 17 and 18. The auxiliary diaphragms 30 are all located axially on the system at an image plane which is conjugate to the plane of the aperture stop or diaphragm 13' of the projection lens 13 so that each auxiliary diaphragm 30 is imaged in the plane of said aperture stop or diaphragm 13' and the relative size or opening of each of the three illustrated auxiliary diaphragms 30 is proportionately maintained when they are projected into the plane of the diaphragm 13' of lens 13. For illustrative purposes, the diaphragm images 13" of the auxiliary diaphragms 30 in Fig. 4 are shown displaced to one side of the lens 13 out of their true position since all of these images 13" are located in a single plane which is coincident with the diaphragm 13' shown in Figs. 1 and 2. The provision of the auxiliary diaphragms 30 permits the speed of the projection lens 13 to be independently regulated for each of the component colors that are projected by the subsidiary optical systems 16, 17 and 18.

The theory underlying the above-outlined compensation of residual chromatism of the lens 13 may be explained by reference firstly to Fig. 4 wherein it is shown how the various spectral wave bands of light, designated Y for yellow, R for red, B and V for blue and violet, respectively, are individually diaphragmed whereby the maximum axial convergence angles are individually controlled and secondly by reference to Fig. 2 which shows the result when a single diaphragm 13' is used for all color components and the largest convergence angles are attained. Decreasing the maximum convergence angle increases the focal range or distance along the axis throughout which the image quality does not sensibly change, thereby securing the condition of compensation of the residual chromatic aberration of lens 13.

According to the usual manner of compensation, large amounts of residual chromatic aberration may be compensated by increasing the focal range through the aid of diaphragm 13', Fig. 2. As the diaphragm 13' is constricted, the focal ranges of each of the component colors are extended axially until all the focal ranges include the same axial point whereby the lens 13 is rendered sensibly free from chromatic aberration. While achromatism may be achieved thereby, the image quality may deteriorate because the fineness of detail that can be resolved by the lens is also dependent upon the maximum axial convergence angle, the image becoming more coarse or lacking fine detail as the maximum axial convergence angle is decreased. Therefore, there usually exists an optimum setting of the diaphragm 13' that compromises both the effect of residual aberrations, of which the chromatic aberration is only one part, and the diffraction of light due to the limiting of the size of the beams of light by the diaphragm 13'.

According to this invention, with regard to the case of residual chromatic aberration, further improvement in image quality can be achieved by resorting to separate compromises of diaphragm openings with respect to each selected color component of the illuminating light.

In view of the foregoing, one practical example of such selective diaphragming is shown in Fig. 5 which represents the sphero-chromatism curves of one particular lens 13 wherein the blue and violet light are diaphragmed from $f/8.0$ to $f/11$, the red light to $f/9$, and the yellow light to $f/8$ and the half focal range of the blue and violet light is thereby increased from $dB$ and $dV$ to $DB$ and $DV$, respectively. This example is further elucidated by reference to Fig. 3 wherein a typical axial chromatism curve for the lens 13 is drawn by plotting the axial intercepts for different wavelengths of light against their respective wavelengths lambda and indicating thereon the effect that is obtained by the selective diaphragming of certain wavelengths of light. At several chosen wavelengths on said curve, vertical lines 39, 40, 41, 42 and 43 are drawn across said curve representing different focal ranges for the various colors which are at least great enough to meet or overlap at a common axial point represented by the horizontal line 44. In Fig. 3, for instance, the lens 13 is diaphragmed selectively for different colors to yield corresponding depths of focus 39, 40, 42 and 43 which correspond to the relative apertures $f/17.2$, $f/6$, $f/6.9$ and $f/10.8$, respectively, when the diaphragm for the 520 mu wavelength is set at $f/8$. The various focal ranges 39, 40, 41, 42 and 43 may be made larger if it is desired to have the various focal ranges overlap to a greater degree.

Generally speaking, different components of light vary as to their ability to affect the image quality, wherein there may be, and usually are, preferred components of light containing a better share of useful image detail. Therefore, the selective diaphragming depends not only upon the residual chromatic aberration in lens 13 but also upon the characteristics of the image receiving surface materials, such as color film, and mechanisms, such as the eye, that are used for the recording and/or evaluating of the final image. Therefore, it is to be understood that if such surfaces and mechanisms are to be unchanged, the selective diaphragming, once set, will not have to be changed. However, if either the characteristics of the surfaces or said mechanism are altered, then a resetting of the selective auxiliary diaphragms 30 would be advisable. It should also be understood that the auxiliary diaphragms 30 are not used to affect color balance in a printed film but are used only to compensate the residual chromatism of the projection lens. Since the illumination of the film may be provided by any desired number of light sources of different spectral qualities, it is evident that there is considerable latitude in the character of the residual chromatism that can be compensated by the described means and still be compatible with the color response of the image receiving surface.

Further practical examples of the results obtained by the use of this invention are illustrated in Figs. 6 and 7. Fig. 6 shows the spot sizes for specified wavelengths of light when a point image is formed by lens 13 and diaphragmed by 13' at some compromise setting according to usual custom. Fig. 7 shows the improvement obtained with the aid of the selective auxiliary diaphragms 30 of the preferred example of our invention shown in Fig. 1.

From the foregoing description, it will be perceived that the prime purpose of this invention is the substantial elimination or compensation of residual chromatic image errors that are caused by a projection lens where said errors for practical reasons cannot be corrected by refinements in lens design. The described compensation has been achieved in this invention by simple, reliable and effective means whereby residual chromatic lens aberrations having considerable latitude of spectral qualities may be compensated.

Various modifications and adaptations may be made to adapt this invention to other apparatus than that here described such as microscope lighting means and projection apparatus. In microscope lighting, for instance, the different component color beams would be projected through the substage condenser onto the under side of the object slide to trans-illuminate the specimen and said beams would be individually and selectively diaphragmed and projected simultaneously into the microscope objective which serves as the aforementioned projection lens in this case. The residual chromatism of the objective would then be corrected in the same manner as in the first described embodiment. Obviously, changes may be made in the details of construction and arrangement of its parts without departing from the spirit of this invention as claimed herebelow.

We claim:

1. In a projector for printing motion picture film the combination of a projection lens for projecting an image of the film onto an image receiving surface, means for transilluminating the film comprising a plurality of auxiliary optical systems, each system including a light source, filter, lens means and adjustable diaphragm means arranged in optical alignment, each filter passing a different wave band of light, aligned optical means for combining the colored light projected by each system and directing the combined light onto the film, each diaphragm in each system being located in conjugate relation to and imaged by means including said lens means in the aperture stop of the projection lens whereby the speed of each auxiliary system may be selectively controlled to compensate the residual chromatism in the first named lens.

2. An optical projection system comprising a projection lens for forming an image of a transparent object, means for transilluminating the object comprising a plurality of auxiliary optical systems each including a light source, a filter, lens means and an adjustable diaphragm, each filter being constructed to pass a different wave band of light, optical means for combining the light beams from said auxiliary systems and directing the combined light onto the object, and additional lens means coacting with the first named lens means for imaging each diaphragm of each system in the aperture stop of the projection lens whereby the focal range of each light beam may be extended at least to a focal plane which is common to all beams and thereby compensate the aberrations in the projection lens.

3. An optical projection system comprising a projection lens for forming an image of an object, means for illuminating the object comprising a plurality of auxiliary optical systems each projecting a different colored light component onto the object, adjustable diaphragm means in each auxiliary lens system and optical focusing means for projecting an image of each diaphragm means into the aperture stop of the projection lens whereby the speed of each auxiliary system may be selectively controlled to compensate the residual chromatism of the projection lens.

References Cited in the file of this patent

UNITED STATES PATENTS

| 1,621,741 | Kellner | Mar. 22, 1927 |
| 1,688,607 | Wright | Oct. 23, 1928 |
| 1,890,764 | Wright | Dec. 13, 1932 |
| 2,027,369 | Bourges | Jan. 14, 1936 |
| 2,352,915 | Rackett | July 4, 1944 |
| 2,354,108 | Flemming | July 18, 1944 |
| 2,402,660 | O'Grady | June 25, 1946 |
| 2,589,930 | Dimmick et al. | Mar. 18, 1952 |
| 2,672,072 | Sachtleben et al. | Mar. 16, 1954 |
| 2,672,502 | Albright | Mar. 16, 1954 |
| 2,703,506 | Kelly | Mar. 8, 1955 |
| 2,792,740 | Haynes | May 21, 1957 |

FOREIGN PATENTS

| 525,143 | Germany | May 20, 1931 |